Aug. 24, 1954
W. H. TANKE
2,687,238
FERTILIZER ATTACHMENT
Filed May 19, 1949
3 Sheets-Sheet 1
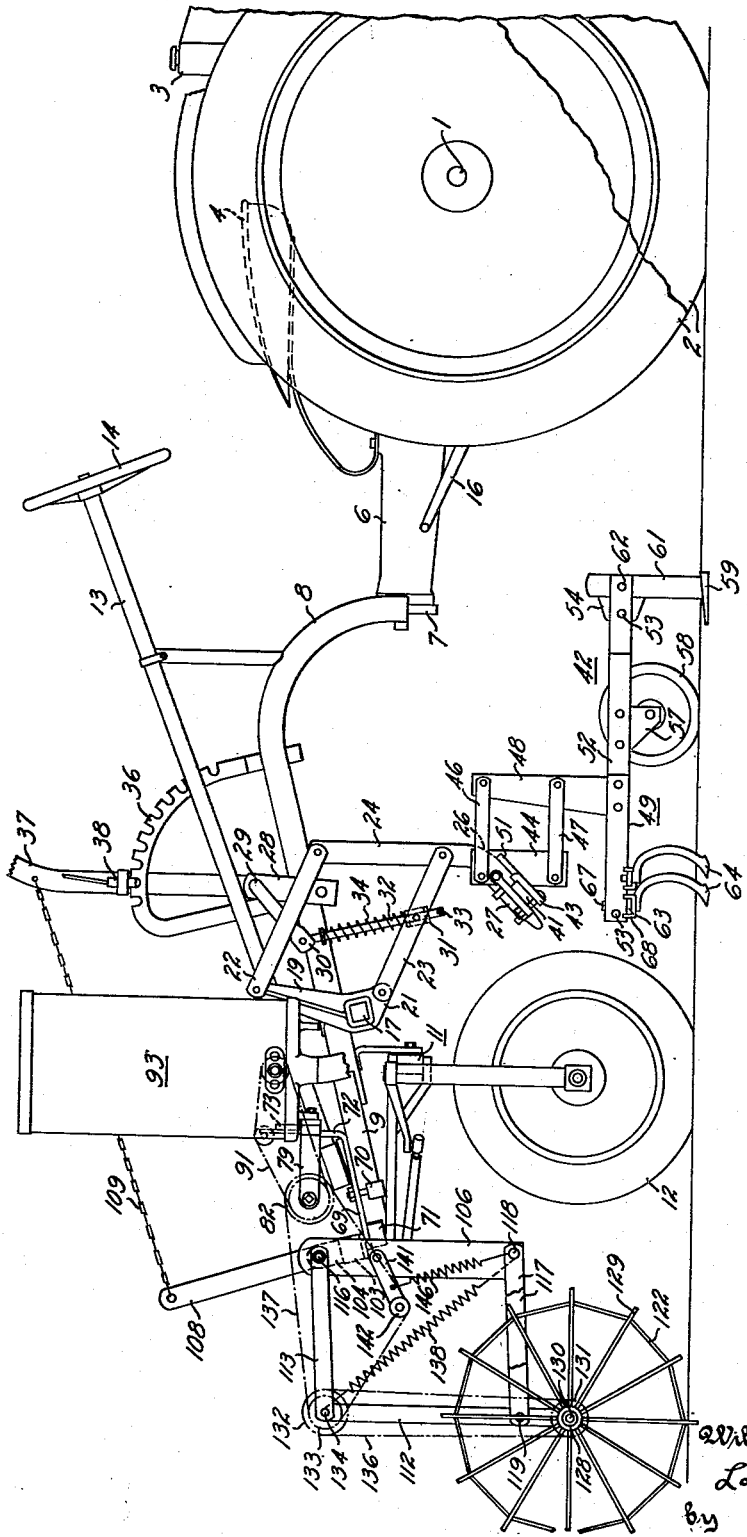

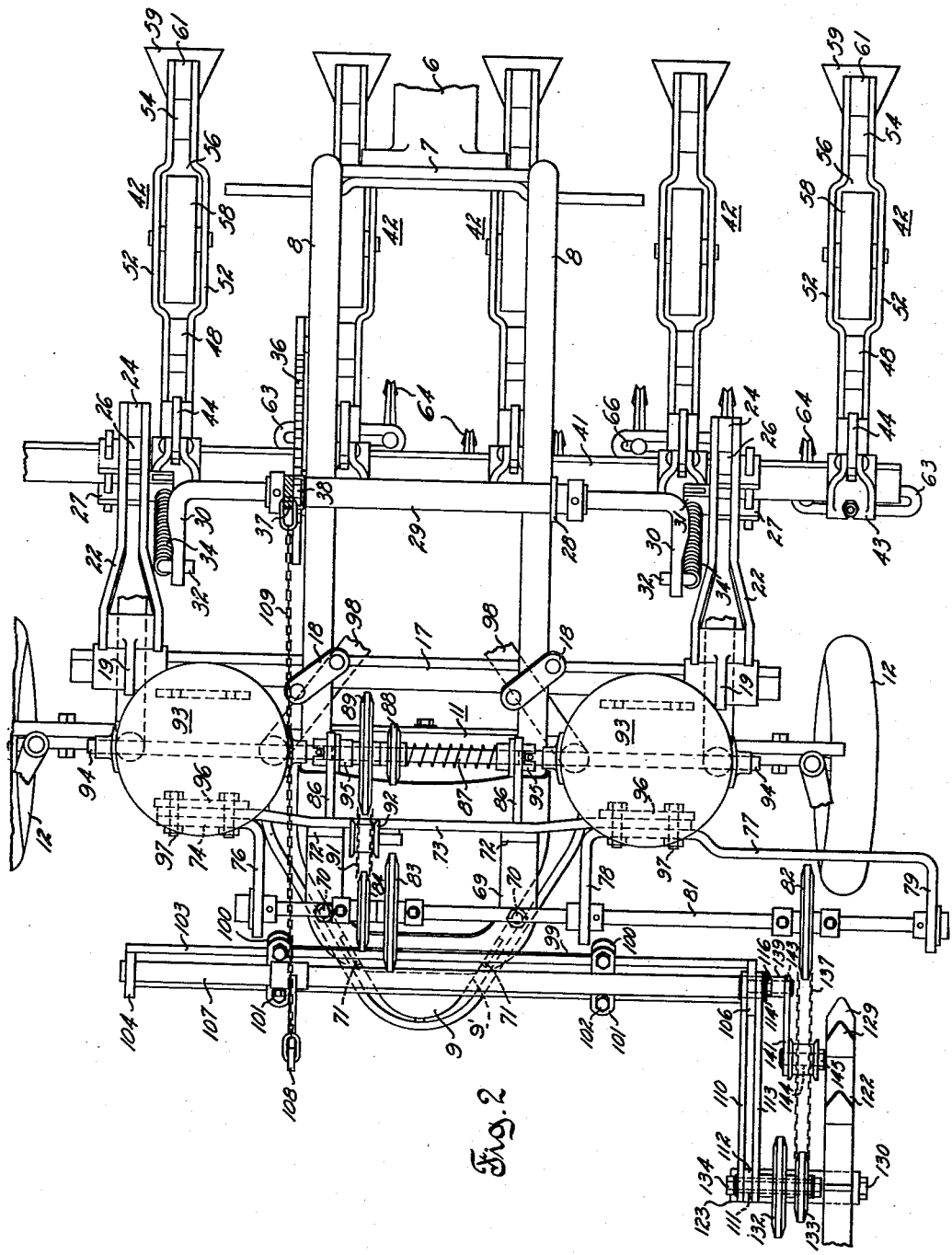

Aug. 24, 1954     W. H. TANKE     2,687,238
FERTILIZER ATTACHMENT
Filed May 19, 1949     3 Sheets-Sheet 3
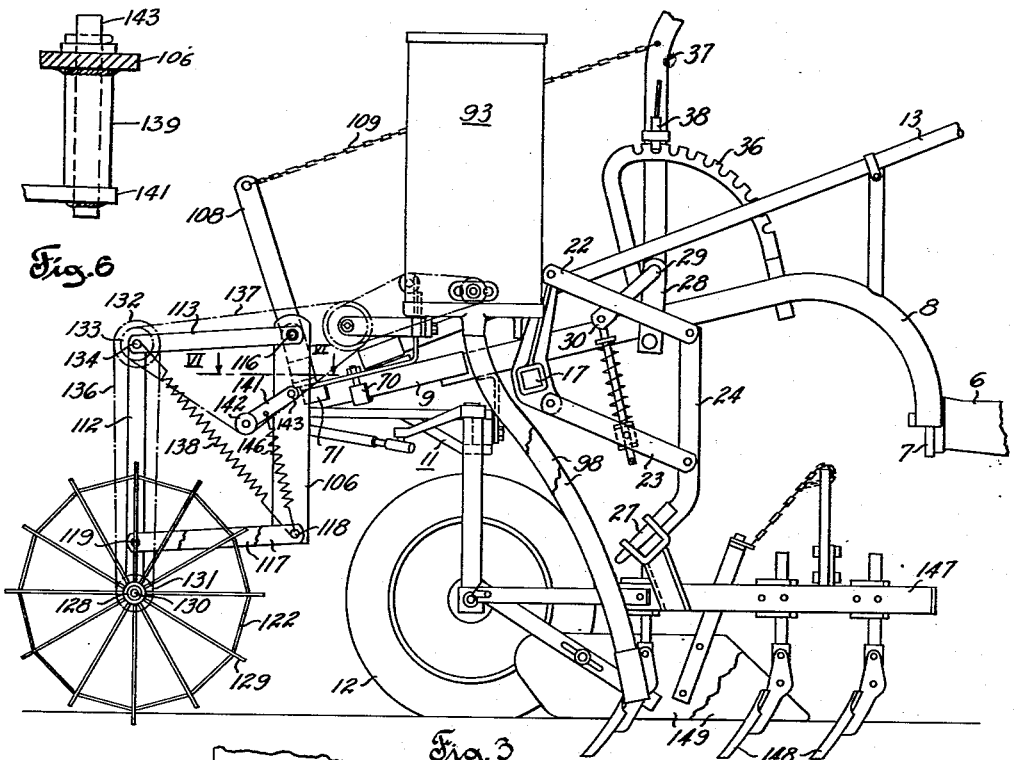

Patented Aug. 24, 1954

2,687,238

UNITED STATES PATENT OFFICE 2,687,238

FERTILIZER ATTACHMENT

Willard H. Tanke, La Crosse, Wis., assignor to Allis-Chalmers Manufacturing Company, Milwaukee, Wis., a corporation of Delaware Application May 19, 1949, Serial No. 94,151

5 Claims. (Cl. 222—135)

This invention relates generally to an attachment adapted to be secured to a traveling support for use separately or in combination with implements associated with such support, and is more particularly concerned with the improvement of features advantageously affecting ease of attachment, operation and general utility.

In utilizing an attachment of the type above mentioned, for example a fertilizer dispenser used in conjunction with a planter, cultivator or other implement attached to a suitable traveling support, hereinafter referred to as a "tractor," it has heretofore been necessary to mount the dispenser in adjacent coacting relation to the other implement which in turn usually requires special attaching parts in order to provide an operative combination. Consequently, the position of the dispensing apparatus must often be such as to obstruct the operator's view of the associated implement, and more particularly implements, such as ground working tools, seeding rigs, and the like, disposed beneath and/or adjacent forward portions of the tractor. Moreover, the time and effort expended in effecting the changes necessary to operatively associate the dispensing mechanism with the various different types of implements could be more advantageously utilized.

Therefore, it is an object of the present invention to provide an attachment incorporating features of design and construction coactable with each other and with parts of a tractor in a manner affording improvement as to ease of attachment, as to the viewability of underslung implements afforded an operator seated on the tractor, and/or as to the readiness with which the attachment can be operatively associated with different types of other implements propelled by the tractor.

Another object of this invention is to provide an implement attachment incorporating parts constructed and combined in an improved manner affording a simplified adjustment of parts, and rendering the attachment readily usable with tractors having either a wide axle or tricycle type front support.

Still another object of the present invention is to provide a fertilizer attachment affording improved features as to the means for adjusting and operating the dispensing mechanism.

A further object of this invention is to provide an implement attachment embodying features affording a simplified and relatively inexpensive construction which can be readily attached, adjusted and operated, either separately or in combination with other implements, with a minimum of time, effort and skill.

Accordingly, the present invention may be considered as comprising the various features affording means for accomplishing one or more of the above stated objects as hereinafter more fully pointed out in the detailed description and appended claims. And in this connection, the construction, attachment and operation of an illustrative apparatus will become readily apparent from a consideration of the following disclosure, reference being had to the accompanying drawings, in which:

Fig. 1 is a side view of a tractor-implement combination embodying the invention;

Fig. 2 is an enlarged plan view of the forward portion of the combination shown in Fig. 1;

Fig. 3 is a partial side view along the lines of Fig. 1 showing the attachment combined with a different type of implement;

Fig. 4 is a front elevation of the structure shown in Fig. 3 with parts omitted for purposes of clarity;

Fig. 5 is a view taken along line V—V of Fig. 4 showing the ground wheel support arm; and Fig. 6 is an enlarged plan section on line VI—VI of Fig. 3 showing in detail the supporting pivotal connection for the idler wheel.

Referring particularly to Figs. 1 and 2, it will be seen that the traveling support or tractor element of the combination includes a rear axle structure 1 mounting a pair of laterally spaced ground engaging traction wheels 2 at opposite ends thereof and mounting a centrally disposed rearwardly extending power unit (of which only the radiator 3 is shown) drivingly connected in a conventional manner with the axle elements mounting the traction wheels 2. An operator's seat or station 4 is mounted on a tubular frame part 6 extending forwardly from a central portion of axle structure 1 and is disposed between rear tracton wheels 2 in elevated relation to axle structure 1 and in forward adjacent relation to radiator 3. A plate member 7 is fixedly secured to the forward end of the central frame part 6, being positioned thereby transversely of the tractor, and a pair of laterally spaced upwardly arched tubular frame members 8 present rear end portions which are rigidly united with part 7. A rigid plate member 9, generally triangular in shape and having a continuous flange formed on two sides thereof, the third side being unflanged, is rigidly bracingly secured to the front end portions of frame members 8 and is thereby disposed in forward overhanging relation thereto with the unflanged side to the rear and opposed rear end portions of said flange extending downward and side abutting the laterally outer sides of frame members 8. This forward frame portion is supported on a front axle structure 11, which mounts a pair of laterally spaced ground engaging dirigible wheels 12 on opposite end portions thereof. The steering mechanism includes a rearwardly extending shaft 13, which mounts a steering wheel 14 disposed within easy reach of an operator sitting at station 4, and it is to be understood that the tractor is also provided with the usual operator actuated controls, of which only a single foot pedal 16 is shown.

A rigid transverse cross bar 17 is secured to the underside of opposed portions of tubular frame members 8 by means of suitable clamps 18 and is disposed thereby immediately to the rear of the front axle structure 11. Bar 17 is generally parallel to the front axle structure 11 and preferably projects equal distances to either side of frame members 8. A similar hanger member is secured on each end portion of bar 17 for adjustment longitudinally thereof, and presents an upwardly extending arm 19 and a depending arm 21. The upper arm 19 of each hanger pivotally mounts a rearwardly extending link 22, and the depending arm 21 of each hanger pivotally mounts a rearwardly extending link 23. The rear ends of upper and lower links 22 and 23 are pivotally connected with vertically spaced portions of a rigid link 24, which extends beneath lower link 23 and terminates in a forwardly projecting end portion 26 having clamp means 27 associated therewith for the reception of a rectangular tool frame bar. It is to be understood that the laterally spaced hangers, one on each side of the tractor, are in transverse alignment relative to the longitudinal axis of the tractor, and that the clamp means 27 depending therefrom are similarly aligned.

A pair of upstanding brackets 28 are secured to opposed portions of frame members 8 in any suitable manner, and the shaft 29 is rotatably mounted in these brackets, being disposed thereby on the top side of frame members 8 and in generally parallel relation to front axle structure 11 and bar 17. The opposite end portions of shaft 29 are bent at a right angle to the main body thereof so as to form crank arms 30, each arm being positioned in forward and downward extending relation with respect to the longitudinal axis of the shaft and generally laterally adjacent to the inner side of the associated one of upper links 22. Preferably shaft 29 is a conventional fabricated structure comprising a tubular main element telescopically receiving separate crank elements (note Fig. 2) for selectively positioning arms 30 to conform with any selected lateral adjustment of the similar hanger members on bar 17. The free end of each crank arm 30 has an operative lost motion connection with an intermediate portion of the adjacent one of lower links 23, this connection being a well known type comprising a pivot block 31, a lift rod 32 slidably extending through block 31, a pin 33 preventing withdrawal of rod 32 from block 31, and a compression spring 34 surrounding the intermediate portion of rod 32. A lift mechanism comprising a notched quadrant 36 and a lever 37 mounting a quadrant engaging latch 38 are operatively associated with shaft 29 for actuating and maintaining the shaft in a selected position to thereby adjust the vertical position of clamp means 27 relative to the frame 8. Preferably the upper portion of lever 37 (not shown) extends rearward to a point within easy reach of an operator seated at station 4, and it should now be obvious that laterally aligned parts 27 constitute a pair of underslung vertically adjustable implement supports.

A ground working implement comprising a draft member 41 and a plurality of rigs 42 (five being shown) is carried by parts 27. Draft member 41 is an elongated rigid bar, rectangular in transverse cross section, mounted on parts 27 for movement therewith and positioned thereby to extend horizontally transversely of the tractor in underslung relation thereto and in symmetrical relation to the longitudinal axis of the tractor. The rigs are detachably secured to spaced portions of draft bar 41 for selective adjustment therealong and are positioned thereby in depending trailing relation thereto.

Each rig 42 includes a detachable bar-engaging clamp 43 fixedly secured in any suitable manner to the forward edge of a rigid plate member 44. A pair of upper and lower rearwardly extending links 46 and 47, respectively, present forward ends which are pivotally supported on vertically spaced portions of plate member 44 and rear ends which are similarly pivotally connected with a rigid upstanding part 48 of a tool mounting frame 49. From the description thus far it should be apparent that draft bar 41 may be vertically raised and lowered through means of the parallel linkage comprising link elements 22, 23 and 24, and that such raising and lowering may be readily accomplished by means of lever 37, shaft 29, crank arms 30 and the lost motion rod connection with lower link 23. Furthermore, it should also be obvious that since rig element 44 is fixedly secured to draft bar 41, this part of the tool rig will likewise be raised and lowered in accordance with the movement of draft bar 41. And in order that tool frame 49 may likewise be raised and lowered through actuation of lever 37, plate member 44 is provided with a stop projection 51 adapted to be engaged by the underside of upper link 46 after this plate member has moved upward a predetermined distance, whereupon further upward movement of the draft bar will effect a corresponding upward movement of frame 49.

Tool frame 49 comprises a pair of flat bar stock members 52 secured together in spaced generally parallel relation by means of a plurality of longitudinally spaced bolts 53 and spacer elements 54, the bottom portion of upstanding part 48 also functioning as a spacer element. Bar members 52 having intermediate portions thereof oppositely outwardly offset to provide an enlarged space 56 therebetween in which is suitably mounted, as by means of laterally aligned depending brackets 57, a ground engaging wheel 58. The rear end of frame 49 mounts a sweep element in longitudinal alignment with ground wheel 58, this sweep element including a soil loosening portion 59 and a vertically extending shank 61, which is rectangular in cross section and has its upper portion clamped between the free rear ends of parallel bar members 52 by means of a bolt 62. Preferably, the rear edge of rear spacer element 54 abuts the forward edge of shank 61 as indicated in Fig. 1. The forward end of frame 49 mounts a pair of laterally extending tool bars 63 each carrying a depending ground working tool 64. Tool bars 63 are rectangular in transverse cross section, and each has a longitudinal slot 66 therethrough for adjustably attaching the tool bar to frame 49, the attaching means comprising a bolt 67, which passes between bar members 52, and a coacting clamping part 68, which receives bolt 67 and engages the underside of the tool bar. The particular manner of tool bar attachment is not of particular significance, and a further description of this feature is deemed unnecessry for a complete understanding of the present invention. However, it should be understood that each tool bar is adjustable laterally relative to the longitudinal axis of frame 49.

An auxiliary or frame structure or, more particularly, a fertilizer attachment frame comprising an attaching member and a hopper support member are carried by the front end of the tractor. The attaching member comprises a flat U-shaped bar 69 seated on plate member 9 and positioned with the closed end thereof forwardly disposed, and with the spaced apart side portions or legs thereof extending rearwardly from the closed end. Opposed intermediate leg portions of attaching member 69 overhang plate member 9, and a pair of bolt elements 70 pass through these portions, project downwardly therefrom alongside the flange of the plate member, and hook under said flange, detachably securing the member 69 thereto. Parts 71 are rigidly secured to opposite end portions of said closed end and depend therefrom in forward side abutting relation to opposed converging outer side faces 9' of the flange on plate member 9. The rear portions or elements of frame member 69 turn up to provide laterally aligned post portions 72 which in turn mount a rear part or hopper support member comprising an elongated rigid bar 73, which is rigidly secured, as by welding, to these posts and thereby disposed horizontally transversely relative to the direction of travel and in superimposed spaced relation to plate member 9. The opposite end portions of this support bar are offset downwardly from the main body thereof (see Fig. 4). These end portions are also slightly offset rearwardly from the main body of this support bar (see Fig. 2), being disposed generally over dirigible wheels 12 and affording right and left implement attaching supports or hopper mounting stations, as viewed when looking in the normal direction of travel.

An L-shaped bracket having an attaching leg 74 and a bearing supporting leg 76 is disposed with attaching leg 74 in forward side abutting relation to the right hopper mounting station, and with leg 76 projecting forward therefrom. A generally U-shaped bracket having a bight 77 and legs 78 and 79 is disposed with the bight in forward side abutting relation to the left hopper mounting station, and with the legs projecting forward therefrom in transverse alignment with leg 76, legs 76 and 78 being symmetrically disposed relative to the longitudinal axis of the tractor. A power transmitting shaft assembly comprising a shaft 81 and chain sprockets 82, 83 and 84 is rotatably supported in suitable bearings carried by the laterally aligned bracket legs 76, 78 and 79 in a conventional manner, the shaft being thereby disposed in generally forward parallel spaced relation to support bar 73. Chain sprocket 82 is fixed to an intermediate portion of shaft 81 in a conventional manner for rotation therewith and for selective adjustment therealong between legs 78 and 79. Chain sprockets 83 and 84, having large and small pitch diameters, respectively, are mounted in a conventional manner alongside one another on an intermediate portion of this shaft for rotation therewith between legs 76 and 78.

A pair of similar plate brackets 86 are terminally rigidly secured to and extend rearwardly from the support bar 73 in transversely spaced and parallel relation to each other between the hopper mounting stations. A mechanism drive shaft assembly comprising a shaft 87 and chain sprockets 88 and 89 is carried by these plate brackets. The opposite ends of shaft 87 are mounted for rotation in said brackets, the shaft being disposed thereby generally in parallel rearward spaced relation to the support bar. Small pitch diameter chain sprocket 88 and large pitch diameter chain sprocket 89 are mounted alongside one another on an intermediate portion of this shaft for rotation therewith and are arranged in longitudinal alignment with sprockets 83 and 84, respectively, on shaft 81. A chain 91 is optionally trainable over sprockets 84 and 89 or sprockets 83 and 88 for rotating shaft 87 at a selected speed, and a chain tightening assembly including an idler wheel 92 is adjustably supported from bar 73 in a conventional manner for tightening chain 91. The particular manner of mounting shaft 87 in brackets 86 is not of particular significance and further description of this feature is deemed unnecessary for a complete understanding of the present invention.

A similar implement or fertilizer dispensing mechanism comprising a hopper structure 93 and a material feeding mechanism (of which only the feeder shaft 94 is shown) is carried at each hopper mounting station. The feed shaft is rotatably mounted in its hopper structure, the base of which is provided with a depending flange 96 adapted for side abutting engagement with the hopper attaching portion of bar 73. And a pair of bolts 97 inserted through aligned holes in this flange, the hopper attaching station, and the associated one of the shaft supporting brackets act to secure these parts together with the flange in rearward side abutting relation to the hopper mounting station and with the inner end of the feeder shaft in proximate axial alignment with the adjacent end of shaft 87. The opposed end portions of shafts 94 and 87 are detachably connected through suitable coupling means 95. Material distributing means comprising a plurality of flexible seed tubes 98 are terminally secured to the base of the hopper structures in material receiving relation thereto and depend therefrom for connection to the underlying ground working rigs by any suitable means (not shown). The particular manner of connecting the fertilizer dispensing mechanism to the hopper mounting station and of connecting the feeder shaft to shaft 87 are not of particular significance, and further description of the fertilizer dispensing mechanism in general and particularly of the aforesaid features is deemed unnecessary for a complete understanding of the present invention.

An elongated flat bar stock member 99 forming a front part of the fertilizer attachment frame is rigidly secured, as by welding, to the bight of U-shaped attaching member 69 and is disposed thereby in parallel superimposed abutting relation thereto. Opposite end portions of this bar member overhang the attaching member, and each of these end portions fixedly mounts a similar elongated lower clamp element 100, which bears against the underside of the member 99 and projects forwardly and rearwardly beyond the opposite longitudinal edges of the latter. An upper clamp element 101 is positioned in superimposed spaced relation to lower clamp element 100 and to bar 99, and a pair of bolts 102 pass through aligned bolt receiving openings in opposite ends of the upper and lower clamp elements. A ground wheel assembly comprising a supporting frame, linkage means and a ground wheel is operatively connected to the implement attachment frame by means of the clamps just described. The supporting frame includes an elongated tubular frame member 103 of square cross section which has a lower side in contact with the upper side of the bar 99. The member 103 is engaged at its upper side by upper clamp elements 101 and the latter are tightened by the bolts 102 so as to secure the member 103 for selective adjustment along the bar 99 transversely to the direction of travel. Bar members 104 and 106 are rigidly secured, respectively, to the right and left end portions of frame member 103. The former extends above frame member 103 and the latter extends both above and below this frame member. Member 104 and the upper portion of member 106 are provided with laterally aligned openings rotatably supporting opposite ends of a rock shaft 107, which is thus positioned in parallel superimposed spaced relation to frame member 103. An actuating arm 108 is terminally secured to an intermediate portion of rock shaft 107 for rotation therewith and for selective adjustment therealong transversely to the direction of travel. Arm 108 extends upward from shaft 107 in generally longitudinal alignment with lever 37, and the fore and aft portions of a lost motion means comprising a chain 109 are attached, respectively, to the free end of arm 108 and to an intermediate portion of lever 37.

A bar member 110 is rigidly terminally secured to shaft 107 and is disposed thereby to extend forward therefrom adjacent to the laterally inner side of member 106, and a tubular shaft element 111 is rigidly terminally secured, as by welding, to the free end of bar member 110 to extend laterally outward therefrom generally parallel to shafts 81 and 107. A link 112 is pivotally suspended from tubular shaft element 111, the upper end of this link being disposed in side abutting relation to the laterally outer side of bar 110. Shaft 107 and tubular shaft element 111 mount the opposite ends of a bar member 113, which is disposed thereby in transverse alignment with bar member 110 and in adjacent side abutting relation to the laterally outer sides of member 106 and of link 112. Bar 113 is preferably secured to shaft 107 by means of a washer 114 and a cap screw 116, the latter being threaded into the outer end of the shaft. It should be apparent that bar members 110, 113, and depending link 112 comprise a fabricated lift link structure mounted on shaft 107 for pivotal movement therewith about the horizontal transverse axis thereof. A pair of similar links 117, having substantially the same length as members 110 and 113, have their rear ends terminally connected to opposite sides of a lower end portion of member 106 by means of a pivot bolt support 118 and have their forward ends pivotally connected to opposite sides of the lower end of link 112 by means of a pivot bolt 119. It should be apparent now that bar members 117 comprise a stabilizing link, and in this connection it should be noted that the horizontal and vertical spacing of shaft 107, tubular element 111, bolt 118 and bolt 119 are such as to afford a stabilized parallel linkage.

As best shown in Fig. 4, a ground wheel 122 and a support arm 123 therefor are carried by link member 112. The support arm is an elongated bar member having an intermediate portion offset from the upper and lower end portions thereof, the intermediate and upper end portions having, respectively, openings 124 and 126 therein, which are both elongated generally longitudinally of the arm (refer to Fig. 5). Hole 124 is located for alignment with the bolt 119 uniting links 112 and 117, and hole 126 is alignable with a hole in the intermediate portion of link 112. Bolts 119 and 127 pass through the alignable holes in link member 112 and support arm 123 and fixedly unite these parts for selective adjustment along the longitudinal axis of link member 112. As best shown in Fig. 4, the upper end portion of arm 123 is thus disposed in side abutting relation to the laterally inner side of link 112, and its intermediate portion is disposed in side abutting relation to the associated one of the links 117. An axle member 128 is rigidly terminally secured, as by welding, to the lower end portion of the support arm 123 to extend laterally outward in generally parallel relation to tubular member 111 and in lower spaced relation to bolt 119. The ground wheel is provided with a series of ground engaging elements 129 projecting radially from spaced portions along its rim and is mounted on the free end of axle 128 for rotation thereabout, being retained thereon in any suitable manner, such as by a nut 130. A chain sprocket 131 is formed on or secured, as by welding, to the inner hub portion of ground wheel 122 for rotation therewith, and may be considered a portion thereof.

Chain sprockets 132 and 133 having large and small pitch diameters, respectively, are rotatably mounted side by side on tubular element 111 with the sprocket 132 disposed next to bar member 113. These sprockets have a common or united hub structure insuring rotation as a unit and are retained on tubular element 111 by means including a bolt 134, which passes therethrough. Sprockets 131 and 132 are disposed in the same vertical longitudinal plane and a driving connection therebetween is established by a chain 136. Sprockets 133 and 82 are disposed in the same vertical longitudinal plane and afford means for driving shaft 81 through a chain 137. A tension spring 138 has one end portion thereof secured to a forward end portion of link 110 and has its opposite end portion secured to bolt 118, this spring being disposed on the laterally inner side of member 106.

A round tubular sleeve 139 is terminally secured, as by welding, to a portion of member 106 intermediate its lower end and shaft 107 to extend laterally outward therefrom. A chain tightener assembly comprising an idler arm 141 and an idler wheel 142 is carried by this sleeve. The idler arm is an elongated member having an elongated element 143 and an axle element 144 rigidly terminally secured thereto, as by welding. These elements are disposed on opposite sides of the arm and at opposite ends thereof. In addition, they are disposed at a right angle to the longitudinal axis of the arm and parallel to one another. The element 143 is rotatably mounted in sleeve 139 for swinging movement of arm 141 about the horizontal transverse axis of element 143, which passes through member 106 and is secured in place by a conventional washer and cotter pin, as shown in Fig. 6, or in any other suitable manner. Idler wheel 142 is rotatably mounted on axle element 144, being retained thereon in any suitable manner such as by a nut 145, and being positioned to engage the upper surface of the lower run of chain 137. A tension spring 146 has one end portion secured to an intermediate portion of arm 141 and has its opposite end portion secured to bolt 118, this spring being disposed on the laterally outer side of member 106.

It will be observed that when lever 37 is in a forward position the ground working implement and the ground wheel 122 are in operating position, as shown in Fig. 1. As the tractor advances, the elements 129 of the ground wheel engage the ground and cause the wheel to turn about axle 128. Since sprocket 131 is fixed to the hub portion of the ground wheel, it turns therewith and by means of chain 136, causes sprocket 132 and sprocket 133 to turn about the axis of tubular element 111, the latter sprocket, chain 137 and sprocket 82 in turn driving power transmission shaft 81. The mechanism drive shaft 87 and feeder shafts 94 coupled thereto are driven from shaft 81 by means of aligned sprockets 84, 89 and chain 91.

The ground wheel moves vertically relative to the tractor to conform with the contour of the ground over which it travels, since the upper and lower parallel links (note 110, 113 and 117) effect a substantially vertical movement of link 112 substantially parallel to itself. Spring 138 acts to urge the linkage means and the ground wheel carried thereby toward the ground. The spacing of axle member 128 relative to tubular member 111 normally is constant but may be changed within limits by loosening bolts 119 and 127, which pass through elongated openings 124 and 126 and fix arm 123 to link 112, and by vertically shifting the former relative to the latter, and then tightening the bolts. As the lift link pivotally moves about the axis of shaft 107 in response to the vertical movement of the ground wheel relative to the tractor, the spacing of tubular member 111 relative to shaft 107 varies and makes it necessary to provide for automatically adjusting the operative length of the chain 137. The chain tightener assembly 141, 142 is provided for this purpose, idler wheel 142 being maintained in chain tightening position by tension spring 146. The actuating arm 108 also moves pivotally about the axis of shaft 107 in response to the vertical movement of the ground wheel relative to the tractor, but lever 37 is not subject to such movement, being normally secured in place by latch 38, which engages quadrant 36. Chain 109 acts as a stop which selectively limits the downward movement of the ground wheel, the length of the chain being adjustable for this purpose. The said chain also acts as a lost motion connection permitting movement of the actuating arm relative to the lever.

As the lever 37 is pulled rearward from the position shown in Fig. 1 the ground working implement supported on parts 27 moves upward into transport position, the lower portion of the flexible seed tubes 98 (not shown) moving upward therewith. At the same time actuating arm 108 responds to this movement and swings rearward, rotating shaft 107 and swinging the lift arm upward for raising the ground wheel from the ground. Consequently, the rotation of feeder shafts 94 and the discharge of material from the hopper structures ceases.

Normally the ground wheel is positioned to accommodate rows of a certain width, but it may be selectively adjusted to accommodate rows of a different width. To accomplish this, bolts 102 of the clamps disposed at opposite ends of bar member 99 are first loosened, the ground wheel assembly is shifted as a unit transversely of the tractor to a suitable position, the supporting frame comprising member 103 sliding over bar member 99, and then said bolts are drawn tight again. Obviously, sprocket 82 must be relocated on shaft 81 for longitudinal alignment with sprocket 133, and actuating arm 108 must be relocated on shaft 107 for longitudinal alignment with lever 37.

In order to remove the fertilizer attachment from the tractor, the seed tubes are detached from the ground working implement, the chain 109 is detached from lever 37, and bolts 70 are unhooked. Then the attachment is manually removed from the tractor, or the tractor is backed away from the attachment. In order to connect the attachment to the tractor, the two are brought together so that attaching member 69 is seated on plate 9. The attaching member is worked back on plate 9 until parts 71, which function as guides, engage the flange of plate 9. Bolts 70 are then drawn tight, and chain 109 is attached to lever 37. In this connection it will be noted that bolts 70 and parts 71, being transversely spaced relative to the direction of travel, afford lateral stability to the attachment.

Ground working implements other than the type shown in Figs. 1 and 2 may be utilized in conjunction with this fertilizer attachment. Fig. 3, for example, shows a ground working implement having a rigid tool frame 147 carried by clamp means 27 and having secured thereto ground working tools 148 and plant shields 149. The lower portions of seed tubes 98 are detachably secured to certain of the working tools by any suitable means. It will be observed that changing from one type of ground working implement to another can be accomplished without materially disturbing the fertilizer attachment. For example, in changing from the type of ground working implement shown in Figs. 1 and 2 to the type shown in Fig. 3, or vice versa, the fertilizer attachment need be disturbed only to the extent of detaching the seed tubes 98 from one ground working implement and connecting them to the other.

It should be obvious now that a fertilizer attachment having a simplified, relatively inexpensive construction is provided. The attachment is mounted on the tractor without intimately associating it with other implements carried thereby, thus dispensing with the special attaching parts generally found necessary for providing an operative combination and affording a saving in the time and effort normally consumed in operatively associating the attachment with other implements. The attachment is self-contained and may be attached to or removed from the tractor as a unit. Furthermore, it may be utilized either separately or in combination with other implements, and the desired change accomplished with a minimum of time, effort and skill. And it will be noted that the attachment coacts with the tractor in such a way that it is immaterial whether the front axle structure of the tractor is of the wide axle or tricycle type. In addition, the attachment is carried by the tractor in such a manner that an operator seated on the tractor is afforded improved viewability of implements carried thereby. And finally, the attachment can readily be adjusted for various row widths and requires no separate operator actuated control.

It should be obvious that although the apparatus herein described as embodying the invention has particular utility in the dispensing of fertilizer, certain features are of more general application and that, therefore, it is not intended to limit the invention to the exact construction and combination herein shown and described for purposes of illustration as various modifications within the scope of the appended claims may occur to persons skilled in the art.

It is claimed and desired to secure by Letters Patent:

1. In combination with a tractor having an unobstructed forward frame portion superimposed on a front axle structure, an auxiliary structure bodily movable as a unit and including an attaching member in superimposed relation to said forward frame portion and detachably secured thereto, said auxiliary structure also including an elongated member mounted on a forward part of said attaching member for endwise adjustment transversely of said tractor, a ground engaging wheel mounted on said elongated member for vertical movement relative thereto and with the wheel positioned in advance of said front axle structure, said wheel being bodily movable with said elongated member for adjustment transversely of the tractor with endwise adjustment of the elongated member, a pair of transversely spaced hopper mounting supports mounted on said attaching member and disposed rearwardly of said forward part, each support being disposed adjacent a side of said forward frame portion, hoppers having material dispensing mechanisms secured to said supports, and actuating means to operate said mechanism including a transverse drive shaft rotatably mounted on said attaching member intermediate longitudinal vertical planes passing through said supports, said actuating means also including an element mounted on said attaching member and adjustable transversely of said tractor in conformity with the endwise adjustment of said wheel transversely of said tractor.

2. In combination with a tractor having an unobstructed forward frame portion and a front axle structure, a dispensing attachment bodily movable as a unit and including an attaching member in superimposed relation to said forward frame portion and detachably secured thereto, said attachment also including an elongated member mounted on a forward part of said attaching member for endwise adjustment transversely of said tractor, a rock shaft mounted on said elongated member in parallel relation thereto for movement bodily therewith, a ground engaging wheel carried by said rock shaft ahead of said front axle structure through a linkage means affording vertical movement of said wheel in response to rocking movements of said rock shaft, means for rocking said rock shaft, a pair of transversely spaced hopper mounting supports mounted on said attaching member rearwardly of said elongated member and disposed with a support adjacent each side of said forward frame portion, a power transmitting shaft rotatably mounted on said attaching member in generally parallel relation to said rock shaft and between the latter and said supports, hoppers having material dispensing mechanisms secured to said supports, means for operating said mechanisms including a drive shaft rotatably mounted on said attaching member intermediate longitudinal vertical planes passing through said supports, and means connecting said drive shaft in driven relation to said wheel comprising a first power transmitting element shiftable on and longitudinally of said power transmitting shaft into alignment with a portion of said wheel and a second power transmitting element fixed to an intermediate portion of said drive shaft and operatively connected with said power transmitting shaft.

3. In combination with a tractor having an unobstructed forward frame portion superimposed on a front axle structure, an auxiliary structure bodily movable as a unit and including an attaching member in superimposed relation to said forward frame portion and detachably secured thereto, said auxiliary structure also including an elongated member mounted on a forward part of said attaching member transversely of said tractor, a rock shaft mounted on said elongated member in parallel relation thereto for rocking movement relative to said elongated member, a ground engaging wheel carried by said rock shaft ahead of said front axle structure through means affording vertical movement of said wheel in response to rocking movements of said rock shaft, means for rocking said rock shaft, a pair of transversely spaced hopper mounting supports mounted on said attaching member rearwardly of said elongated member, each support being disposed adjacent a side of said forward frame portion, a power transmitting shaft rotatably mounted on said attaching member in generally parallel relation to said rock shaft and between the latter and said supports, hoppers having material dispensing mechanisms secured to said supports, a drive shaft rotatably mounted on said attaching member intermediate longitudinal vertical planes passing through said supports and connected in driving relation to said mechanisms, and means including said power transmitting shaft operatively connecting said drive shaft in driven relation to said wheel.

4. In combination with a tractor having an unobstructed forward frame portion and a front axle structure, a dispensing attachment bodily movable as a unit and including an attaching member in superimposed relation to said forward frame portion and detachably secured thereto, said attachment also including an elongated member mounted on a forward part of said attaching member for endwise adjustment transversely of said tractor, a rock shaft mounted on said elongated member in parallel relation thereto for movement bodily therewith, a ground engaging wheel carried by said rock shaft ahead of said front axle structure through a linkage means affording vertical movement of said wheel in response to rocking movements of said shaft, means for rocking said rock shaft including an arm attached to said rock shaft for adjustment longitudinally thereof upon endwise adjustment of said elongated member, a pair of transversely spaced hopper mounting supports mounted on said attaching member rearwardly of said elongated member and disposed with a support adjacent each side of said forward frame portion, a power transmitting shaft rotatably mounted on said attaching member in generally parallel relation to said rock shaft and between the latter and said supports, hoppers having material dispensing mechanisms secured to said supports, means for operating said mechanisms including a drive shaft rotatably mounted on said attaching member intermediate longitudinal vertical planes passing through said supports, and means connecting said drive shaft in driven relation to said wheel comprising a first power transmitting element shiftable on and longitudinally of said power transmitting shaft into alignment with a portion of said wheel and a second power transmitting element fixed to an intermediate portion of said drive shaft and operatively connected with said power transmitting shaft.

5. For use with a tractor, a material dispensing attachment comprising an attaching member having a transverse front part and transversely spaced side portions extending rearwardly from said front part in generally parallel relation to each other, an elongated member secured to said front part for endwise adjustment longitudinally thereof, a ground engaging wheel mounted on said elongated member for vertical movement relative thereto and with the wheel positioned in advance of said attaching member, said wheel being bodily movable with said elongated member for adjustment transversely of said attaching member upon endwise adjustment of said elongated member, a transversely extending part mounted on said attaching member at the rear ends of said side portions and having a pair of transversely spaced hopper mounting supports disposed rearwardly of said transverse front part, each support being disposed outwardly adjacent said side portions of said attaching member, hoppers having material dispensing mechanisms secured to said supports, and actuating means to operate said mechanisms including a transverse shaft rotatably mounted on said attaching member intermediate longitudinal vertical planes passing through said supports, said actuating means connecting said shaft in driven relation to said wheel and also including an element mounted on said attaching member and adjustable transversely of the latter in conformity with the endwise adjustment of said wheel transversely of said attaching member.

References Cited in the file of this patent

UNITED STATES PATENTS

| Number | Name | Date |
| --- | --- | --- |
| 304,830 | Koble | Sept. 9, 1884 |
| 436,649 | Duryea | Sept. 16, 1890 |
| 2,054,513 | Kriegbaum et al. | Sept. 15, 1936 |
| 2,066,666 | Becker | Jan. 5, 1937 |
| 2,144,347 | Silver | Jan. 17, 1939 |
| 2,396,980 | Blue | Mar. 19, 1946 |